March 7, 1961 — E. V. KIRKLAND — 2,973,997
SHAFT BEARING AND SEAL
Filed Sept. 20, 1957 — 2 Sheets-Sheet 1

INVENTOR.
Earl V. Kirkland
BY
Everett A. Johnson
Attorney

March 7, 1961 E. V. KIRKLAND 2,973,997
SHAFT BEARING AND SEAL
Filed Sept. 20, 1957 2 Sheets-Sheet 2
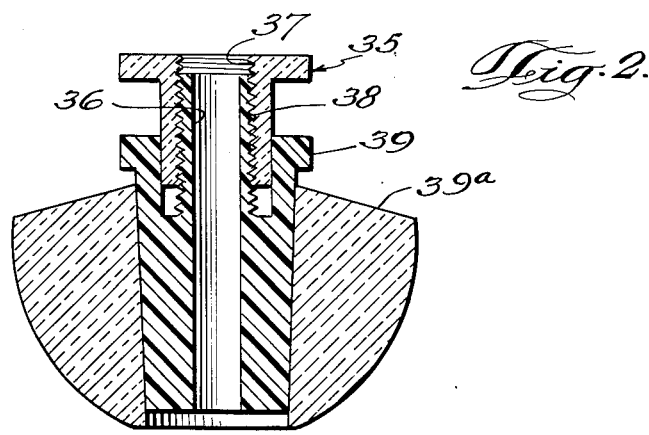
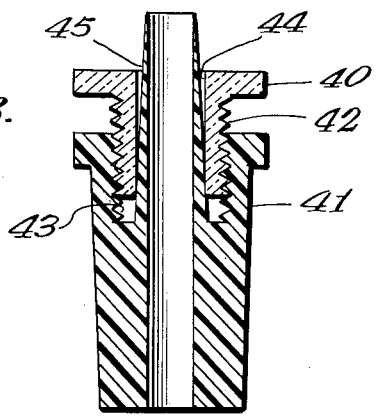
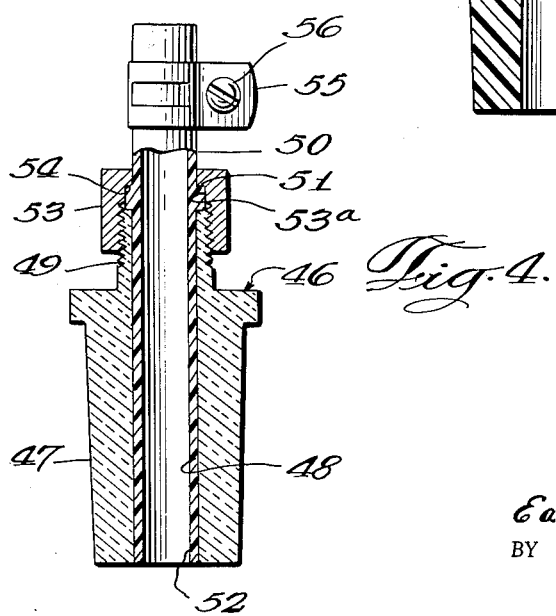
INVENTOR.
Earl V. Kirkland
BY
Everett A. Johnson
attorney United States Patent Office 2,973,997
Patented Mar. 7, 1961

2,973,997

SHAFT BEARING AND SEAL

Earl V. Kirkland, La Marque, Tex., assignor to American Oil Company, Texas City, Tex., a corporation of Texas Filed Sept. 20, 1957, Ser. No. 685,215

6 Claims. (Cl. 308—36.2)

This invention relates to a bearing-adapter for laboratory ware and relates more particularly to a combination closure and bushing or shaft seal.

Heretofore many different means have been proposed for supporting a stirring shaft, thermometer, and the like within a reactor vessel. However, such arrangements have not been generally satisfactory for supporting both rotated and fixed shafts, such as the stem of a thermometer, within the shaft of the reactor. For example, when glass stoppers or glass stirring rods are used, there is excessive wear resulting in leakage and also frequent breakage. Where glass is not used it has been necessary to make frequent replacements because of the solvent or corrosive action of reactants and the action of heat on bushing materials such as rubber and cork.

It is, therefore, a primary object of my invention to provide a bushing and shaft sealing apparatus which avoids the above difficulties. A further object of the invention is to provide a shaft bearing and seal which is essentially self-lubricating. An additional object is to provide an apparatus which is resistant to heat, breakage, and corrosion. A further object of the invention is to provide a combination closure and shaft support which has a minimum of parts. It is also an object of the invention to provide an apparatus which is adapted to be used with conventional vessel openings having a wide range of dimensions and types of seals. These and other objects of the invention will become apparent as the description thereof proceeds.

Briefly, my invention comprises a massive closure or bushing which is shaped so that it will provide a fluid tight set of standard taper or ball joints. The closure may be composed of glass, metal, or the like. A bore, drilled or molded through the massive closure accommodates the shaft to be sealed and a substantial length of the bore is defined by a relatively thin and flexible sleeve. The sleeve may be an integral projection of the massive closure or may be a separable insert secured by suitable means. The flexible sleeve, however provided, may be compressed about the shaft by a clamping means to give a fluid-tight seal. I prefer to use an inert self-lubricating material such as Teflon (polytetrafluoroethylene) which is sufficiently deformable and flexible so that the shaft-receiving bore need not be to exact tolerances.

The optimum wall thickness of the sleeve may vary with different materials but should be sufficient to hold its shape and thin enough to be compressed about the shaft. In general, walls of between about 1 mm. and about 3 mm., preferably about 2 mm., are satisfactory. Heavier walls may be used but greater clamping pressure would be required to obtain an effective seal about the shaft.

The shaft-sealing sleeve may also have a substantially nondeformable body portion provided with a standard taper or ball joint and which in turn is supported by a larger massive closure with a standard taper or ball joint which seals a vessel port.

Further details and advantages of the invention will be described in connection with the accompanying drawings wherein:

Figures 2 and 3 illustrate the embodiments of the apparatus wherein the sealing sleeves integral with the bushings are controlled by a threaded nut; and Figure 4 illustrates an embodiment of the invention wherein the sleeve is separable from the closure, the sleeve is secured to the closure by a threaded member, and the sleeve is collapsed by a clamp.

Figure 1:
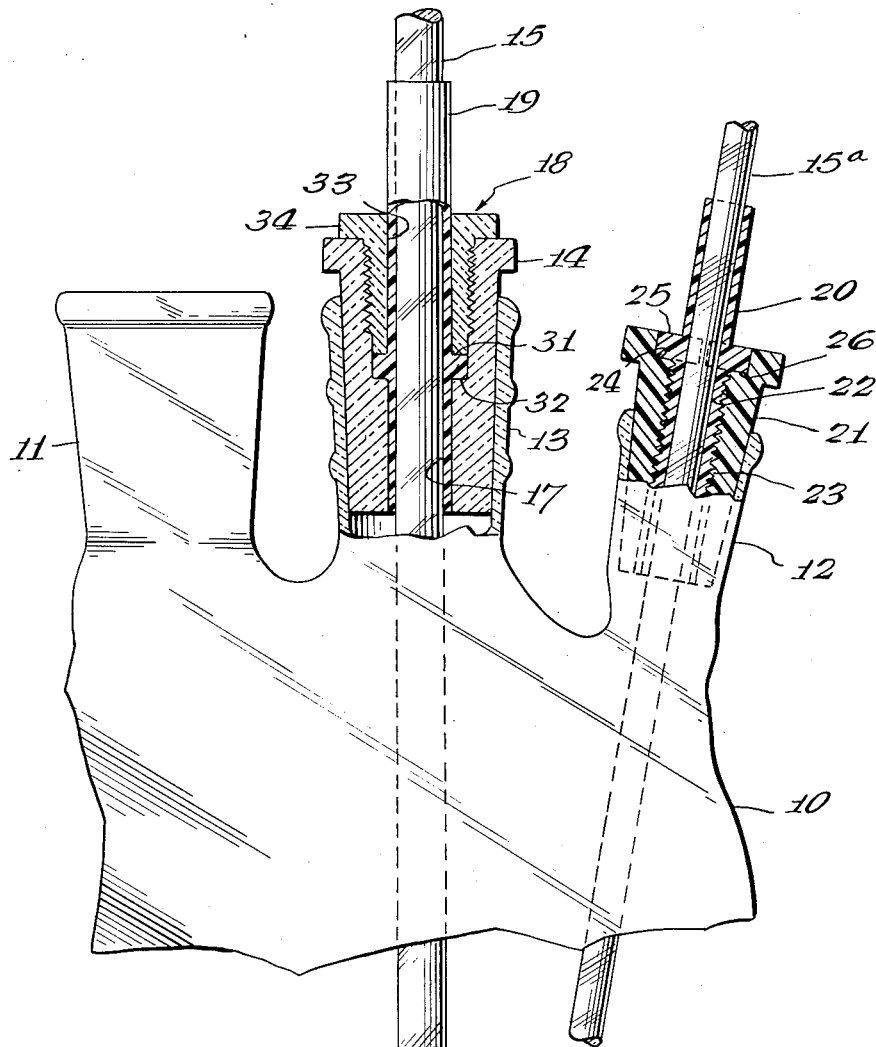
Figure 1 is a fragmentary view of reactor in which a stirring shaft and a thermometer are supported in accordance with my invention.

Referring to the drawings, the reactor 10 is provided with the usual inlet 11, the thermometer well 12, and the neck 13. Each of these comprises a standard tapered glass joint. The neck 13 and the well or receiver bushing 14 which may be as shown on any of the embodiments shown in Figures 2, 3, and 4. The stirring shaft 15, provided with an impeller 16, extends through the bore 17 of the bearing-adapter 14. A threaded clamping nut 18 is disposed about the sleeve 19 in the bushing 14 to give a fluid-tight but rotatable seal.

The bushing 14 may be made from the same material as the deformable sleeve 19 but I prefer that the bushing 14 be made of generally inert material such as glass, whereas the sleeve 19 is made of any material which can be deformed about the shaft 15 to give the right seal.

In Figure 1 on well 12 I show a means by which a deformable sleeve 20 can be attached to a bushing 21, the bushing being provided with threads 22 cut or molded into the inner wall which match and fit corresponding threads 23 on the outer wall of the sleeve 20. The bushing 21 is shown as having a 24/40 standard taper outer wall but it may be of any other size of standard taper joint, semi-ball joint, of other suitable shape.

The sleeve 20 is provided with threads 23 so that it will screw into the bushing 21 until the lower peripheral edge 24 of sleeve shoulder 25 contacts the recess 26 in the bushing 21. As the split shoulder 25 is seated, the inner wall of the sleeve 20 is compressed inwardly around the shaft (in this case a thermometer 15a).

If desired the sleeve 20 can be provided with tapered threads so that as it is turned into the bushing 21, the threads will become tightly seated and form a fluid-tight seal.

Another arrangement is shown on neck 13 in Figure 1 by which a bushing 14 and a deformable sleeve 19 may be joined. In this embodiment, I provide a tight seal between the bushing 14 and the sleeve 19 and also between the sleeve 19 and a shaft by means of a single clamping nut 18. The bushing 14 and sleeve 19 may be of similar or dissimilar materials. The shoulder 31 on the sleeve 19 may be flat in which case the clamping nut 18, when screwed into the bushing 14 holds the shoulder 31 to the seat 32 on the bushing 14. It is also contemplated that the outer edge of the shoulder 31 on the sleeve 19 is tapered downwardly so that as the clamping nut 18 is threaded into the bushing 14 pressure is exerted by the nut 18 to hold the sleeve 19 within the bushing 14 and also the tapered sleeve shoulder 31 is wedged in place thereby deforming the sleeve 19 inwardly in the region of the shoulder 31 to reduce the internal diameter of the sleeve 19 at that point.

The clamping nut 18 comprises an externally threaded plug having a bore 33 extending therethrough and an upper flanged head 34. This clamping nut 18 is best constructed of material such as a metal which receives and retains threads in use. It is protected from all contact with the chemical within the vessel 10 by the sleeve 19 and therefore it need not be inert to the materials present within the vessel.

In Figure 2 the bearing illustrated is provided with a tightening nut 35 which compresses the sleeve 36 about the shaft to form a tight seal therewith. The internal threads 37 of the nut 35 and the external threads 38 on the deformable sleeve 36 are matched tapered threads so that as the nut 35 is tightened pressure is exerted inwardly on the sleeve 36 toward the shaft. The sleeve 36 and the bushing 39 are shown as made of a single material but it is contemplated that they can be separable and can be constructed of similar or dissimilar materials and secured to each other by threads, tapered joint, or the like. The bushing 39 is provided with a standard taper corresponding to the tapered bore in ball joint adapter 39a. It is also contemplated that other combinations of joints than shown in Figure 2 can be used.

Another embodiment of the apparatus illustrated in Figure 3 is provided with a hand-tightening nut 40 and bushing 41 having matched external and internal threads 42 and 43 respectively. The inner diameter of the bore 44 through the nut 40 may be uniform or tapered with the smaller diameter at the outer end of the nut 40. On the other hand, the outer surface of the sleeve 45 is tapered as shown so that as the bore 44 in nut 40 is threaded over the sleeve 45 into the bushing 41 the nut 40 forces the deformable sleeve 45 inwardly into close contact with the shaft. It is also contemplated that the sleeve 45 may be separably fixed to a separate bushing 41 in the manner illustrated, for example, of the embodiments shown in Figures 1 and 2.

A particularly useful form of the invention is illustrated by Figure 4 wherein the bushing 46 is composed of glass and is provided with a standard taper plug 47, an internal uniform bore 48, externally threaded neck 49. The compressible sleeve 50, suitably fabricated from Teflon and provided with an external annular shoulder 51 intermediate the ends of separable sleeve 50, is adapted to have the lower portion 52 thereof inserted into the bore 48 of the bushing 46. A clamping screw cap 53 having a sleeve-receiving port 54 in its upper face is slipped over the exposed end of the sleeve 50 and threaded onto neck 49. It is contemplated that the shoulder 51 may be constructed and may function in the manner described in respect to shoulder 31 in Figure 1; thus the outer surface of 51 may be tapered with respect to the inner surface 53a of the cap 53.

In Figure 4, a compressing clamp 55 which may be carried by the clamping screw cap 53 is provided and clamp 55 is closed by turning the adjusting screw 56, thereby collapsing the sleeve 50 about a shaft.

This application is a continuation-in-part of my copending application Serial No. 504,795, filed April 29, 1955, now issued as U.S. 2,816,743, and entitled "Stirrer Bearing and Adapter."

My invention has been described with reference to particular embodiments but it should be understood that these are by way of illustration only and that my invention is not necessarily limited thereto. Accordingly, it is contemplated that other modifications and embodiments of the apparatus will become apparent to those skilled in the art in view of my foregoing description and such modifications can be made without departing from the spirit of the invention.

What I claim is:

1. An apparatus which comprises a stopper bushing, a bore through said bushing, a deformable sleeve having a first axial portion and a second axial portion, said second axial portion extending within said bore and said first and second portions being unitary, threaded means surrounding said second axial portion of said sleeve, said threaded means being at least partly within said bushing, a recess providing a shoulder in said bore, and an annular shoulder on said sleeve between said first and second portions, said annular shoulder being placed under compression by said threaded means.

2. The apparatus of claim 1 wherein said annular shoulder is wedged into said recess by said threaded means to constrict the sleeve radially inward of the said annular shoulder.

3. An adapter for use with chemical apparatus which comprises a stopper bushing, a bore through said bushing, a separable deformable sleeve extending within said bore, a shoulder about said sleeve, thread engaging means on a portion of said bushing, a threaded cap engaging said shoulder and securing said sleeve within said bore, and clamping means for compressing an axial linear segment of said sleeve radially inward thereby producing a symmetrical restriction within said sleeve.

4. The adapter of claim 3 wherein said cap and said clamping means comprise a unitary operating means which is externally threaded to wedge into said bore and thereby compress said sleeve in the region of said threaded operating means.

5. An apparatus which comprises a stopper bushing, a bore through said bushing, said bushing including a deformable sleeve, one portion of which defines an annular cavity between said one portion and the main body of the bushing, the other portion of said sleeve extending axially beyond the main body, annular nut means surrounding said one portion and being at least partly within said annular cavity, said sleeve being externally threaded and said annular nut being internally threaded with tapered threads to compress said sleeve radially inward when entering said cavity.

6. An apparatus which comprises a stopper bushing, a bore through said bushing, said bushing including a deformable sleeve, one portion of which defines an annular cavity between said one portion and the main body of the bushing, the other portion of said sleeve extending axially beyond the main body, annular nut means surrounding said one portion and being at least partly within said annular cavity, the outer wall of said sleeve being tapered, said cavity being internally threaded, and said annular nut means being externally threaded and having a bore which compresses said tapered sleeve when said nut means enters said cavity.

References Cited in the file of this patent

UNITED STATES PATENTS

| | | |
|---|---|---|
| 1,844,409 | Rypinski | Feb. 9, 1932 |
| 2,455,202 | Ware | Nov. 30, 1948 |
| 2,829,931 | De Pree et al. | Apr. 8, 1958 |
| 2,831,714 | Thorburn | Apr. 22, 1958 |